May 2, 1939. W. H. BACHMANN 2,156,560
COMPRESSION BRAKE SYSTEM
Filed Nov. 1, 1937

FOR USUAL BRAKE OPERATION

INVENTOR.
Walter H. Bachmann
BY Spear Rawlings & Spear
ATTORNEYS.

Patented May 2, 1939

2,156,560

UNITED STATES PATENT OFFICE 2,156,560

COMPRESSION BRAKE SYSTEM

Walter H. Bachmann, Athol, Mass.

Application November 1, 1937, Serial No. 172,146

3 Claims. (Cl. 192—3)

This invention relates to braking systems for motor vehicles and particularly such as are propelled by internal combustion motors of plural cylinder types.

The problem of the braking control of such vehicles has been of increasing complexity with the complication of traffic and the increase in weight, size and power, especially in trucks, busses, as well as in larger types of commercial vehicles and pleasure cars.

In spite of the many improvements in brakes and their operating means, difficulties and accidents are of serious frequency of occurrence, and on the increase in spite of desperate campaigns to reduce mortality and damage.

The standardization of automotive equipment, as well as the accumulated habits and experience of the driving public, impose many practical limitations on remedies theoretically possible to be applied. My concept therefore contemplates improvements involving as little departure as possible from the known and accepted factors and features which have come into use. In carrying out my invention I provide for a basis on which by simple changes in structures, cars of a wide variety of design and engineering can be given new and added factors of safety.

As illustrative of my invention I have shown in the accompanying drawing a somewhat schematic illustration of a simple installation as applied to common features of ordinary vehicle construction.

Throughout the specification and drawing like reference characters are used to indicate corresponding parts, and in the drawing.

Figure 1:
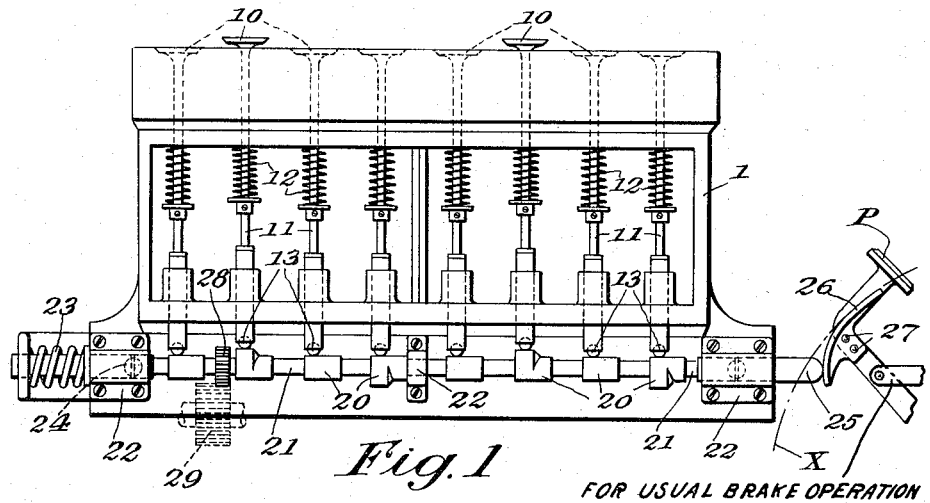
Fig. 1 is a schematic side elevation of so much of a familiar type of motor as is necessary here to be considered, the parts being indicated as in regular operating positions.

Referring to the system indicated in Fig. 1, I have indicated at 1 the block of an internal combustion motor having a plurality of cylinders which with their respective pistons are not detailed as being of any usual construction and connected in any usual drive to the driving wheels of the vehicle.

The cylinders of the block 1 are provided with usual ports controlled by valves 10 having stems 11 held down by their springs 12 so that their lower anti-friction ends 13 contact each with its respective subjacent operating cam 20.

These cams are mounted on rotatable cam shaft 21 driven in any suitable manner as through a pinion 28 driven by the elongated gear 29 with which it slidably meshes. The shaft 21 is rotatably supported as in bearings 22 in which it also is slidably mounted. The sliding movement of the shaft 21 is yieldingly resisted by a compression spring 23 backed up by an anti-friction bearing 24. Its sliding movement may be effected by contact of a cam 27 on the usual brake pedal P which makes a passing contact with an anti-friction thrust member 25 when the pedal P is depressed when the driver starts to apply his usual brakes with which the car is equipped. The pedal P is the usual pedal for operating the conventional brake system of a motor vehicle. This sliding movement is only a slight one sufficient to clear the main or operating cam face 20' of the cams 20 and permit the end 13 of the valve stem 11 to ride down the intermediate conic incline to the short radius cylindrical hub portion $20^2$ on which it can idle.

Figure 2:
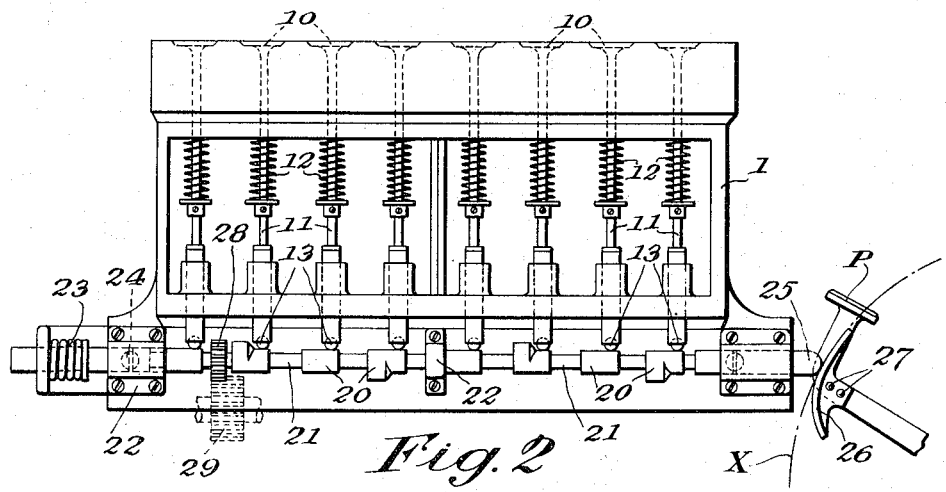
Fig. 2 is a similar view but with the braking system operating in its compression phase.
Figure 3:
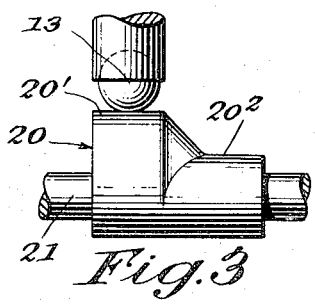
Fig. 3 is a fragmentary detail of a valve tappet end and its subjacent cam as in normal lifting position.
Figures 4, 5:
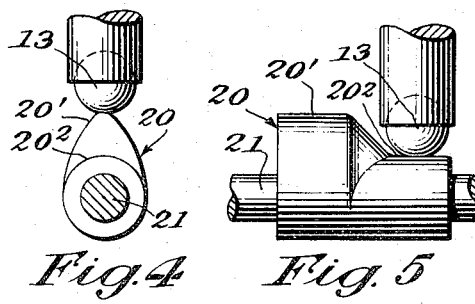
Fig. 4 is an end view of the same.
Fig. 5 is a view corresponding to Fig. 3, but with the valve stem idling on the cylindrical cam shoulder.
Figure 6:
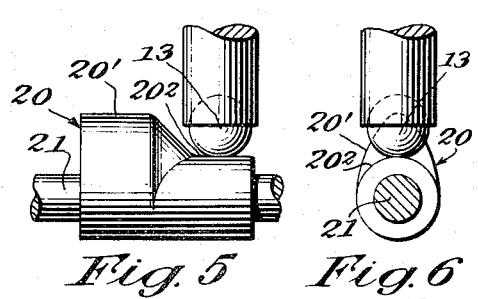
Fig. 6 is an end view comparable with that of Fig. 4, but with valve stem idling as in Fig. 5.

This closes the valves 10 and throws the system under compression as indicated in Fig. 2 by reason of which it acts as a brake on the driving wheels of the vehicle independently of the usual foot brake whose burden is correspondingly relieved and the wear of its lining reduced so as to preserve its efficiency and save the cost of relinings and readjustments such as now have to be frequently made.

In applying the principles of my invention to installations of various designs, its details and design will be variously engineered according to the individual preferences or the policies as dictated by those in authority. The drawing is therefore to be understood as illustrative and not intended to express any limitations on the broadest interpretation of my invention.

What I therefore claim and desire to secure by Letters Patent is:

1. In an automotive internal combustion engine for use in a motor vehicle having a brake system including a brake operating pedal, said engine having a plurality of cylinders and a plurality of cam operated compression control valves, means adapted to interrupt the cam operation of two or more valves simultaneously to effect their closure and to utilize compression in those cylinders in braking retardation of the vehicle's movement, and means to operate said cam interrupting means coincidentally to the operation of said brake system by said pedal, said operating means including a cam carried by said brake pedal.

2. In an automotive internal combustion engine for use in a motor vehicle having a brake system having a brake operating pedal, said engine having a plurality of cylinders, a plurality of compression control valves for said cylinders, a rotatably driven cam shaft having a series of valve operating cams to operate said valves, said shaft being slidably mounted for movement into a position wherein said cams are ineffective to operate said valves, compressible means in control of one end of said shaft to maintain said cams in operative relation to said valves, and means to slide said shaft against the action of said compressible means to render said cams inoperative to open said valves, said last-named means including a cam carried by said brake pedal.

3. In an automotive internal combustion engine for use in a motor vehicle having a brake system having a brake operating pedal, said engine having a plurality of cylinders, a plurality of compression control valves for said cylinders, a rotatably driven shaft having a series of valve operating cams, said shaft being slidably mounted and at least two of said cams being adapted to become ineffective to operate said valves on sliding movement of said shaft, compressible means opposing the sliding movement of said shaft, and operator controlled means to slide said shaft against the action of said compressible means, said operator controlled means including a cam carried by said broke operating pedal to actuate said shaft.

WALTER H. BACHMANN.